United States Patent [19]
Gonzalez

[11] Patent Number: 5,927,236
[45] Date of Patent: Jul. 27, 1999

[54] VARIABLE STROKE MECHANISM FOR INTERNAL COMBUSTION ENGINE

[76] Inventor: Luis Marino Gonzalez, Apartado Postal 40.200, Caracas 1040-A, Venezuela

[21] Appl. No.: 08/959,513

[22] Filed: Oct. 28, 1997

[51] Int. Cl.⁶ .................................................. F02B 75/32
[52] U.S. Cl. ..................................... 123/78 F; 123/197.4
[58] Field of Search ................................ 123/78 F, 197.1, 123/197.4; 92/48 B, 140

[56] References Cited

U.S. PATENT DOCUMENTS

| | | |
|---|---|---|
| 1,278,563 | 9/1918 | Austin . |
| 1,326,129 | 12/1919 | Chadbourne . |
| 1,326,733 | 12/1919 | Hulse . |
| 1,786,423 | 12/1930 | Cady . |
| 1,964,096 | 6/1934 | Tucker . |
| 2,394,269 | 2/1946 | Svete . |
| 3,686,972 | 8/1972 | McWhorter . |
| 3,861,239 | 1/1975 | McWhorter . |
| 4,044,629 | 8/1977 | Clarke . |
| 4,152,955 | 5/1979 | McWhorter . |
| 5,040,502 | 8/1991 | Lassiter ................................. 123/197.4 |
| 5,060,603 | 10/1991 | Williams . |
| 5,158,047 | 10/1992 | Schaal et al. . |
| 5,165,368 | 11/1992 | Schechter . |
| 5,170,757 | 12/1992 | Gamache ............................. 123/197.4 |
| 5,465,648 | 11/1995 | Cy ............................................. 92/140 |

OTHER PUBLICATIONS

S.C. Blakely, R.J. Saunders, T.H.Ma and A. Chopra, "A Design and Experimental Study of An Otto Atkinson Cycle Engine Using Late Intake Valve Closing", SAE International, Feb. 25–Mar. 1, 1991, 12 pp.

Primary Examiner—Henry C. Yuen
Assistant Examiner—Hai Huynh
Attorney, Agent, or Firm—Kennedy Covington Lobdell & Hickman LLP

[57] ABSTRACT

A mechanism for varying the stroke length of an internal combustion engine during each cycle of operation includes a gear set with at least two gear members with a first gear member being non-rotatably mounted to the engine block and a second gear member being operatively engaged with the first gear member and having teeth formed on an inner surface thereof with the gear ratio of the gear set being 1:2 to produce a variable stroke length throughout the engine operating cycle.

22 Claims, 10 Drawing Sheets

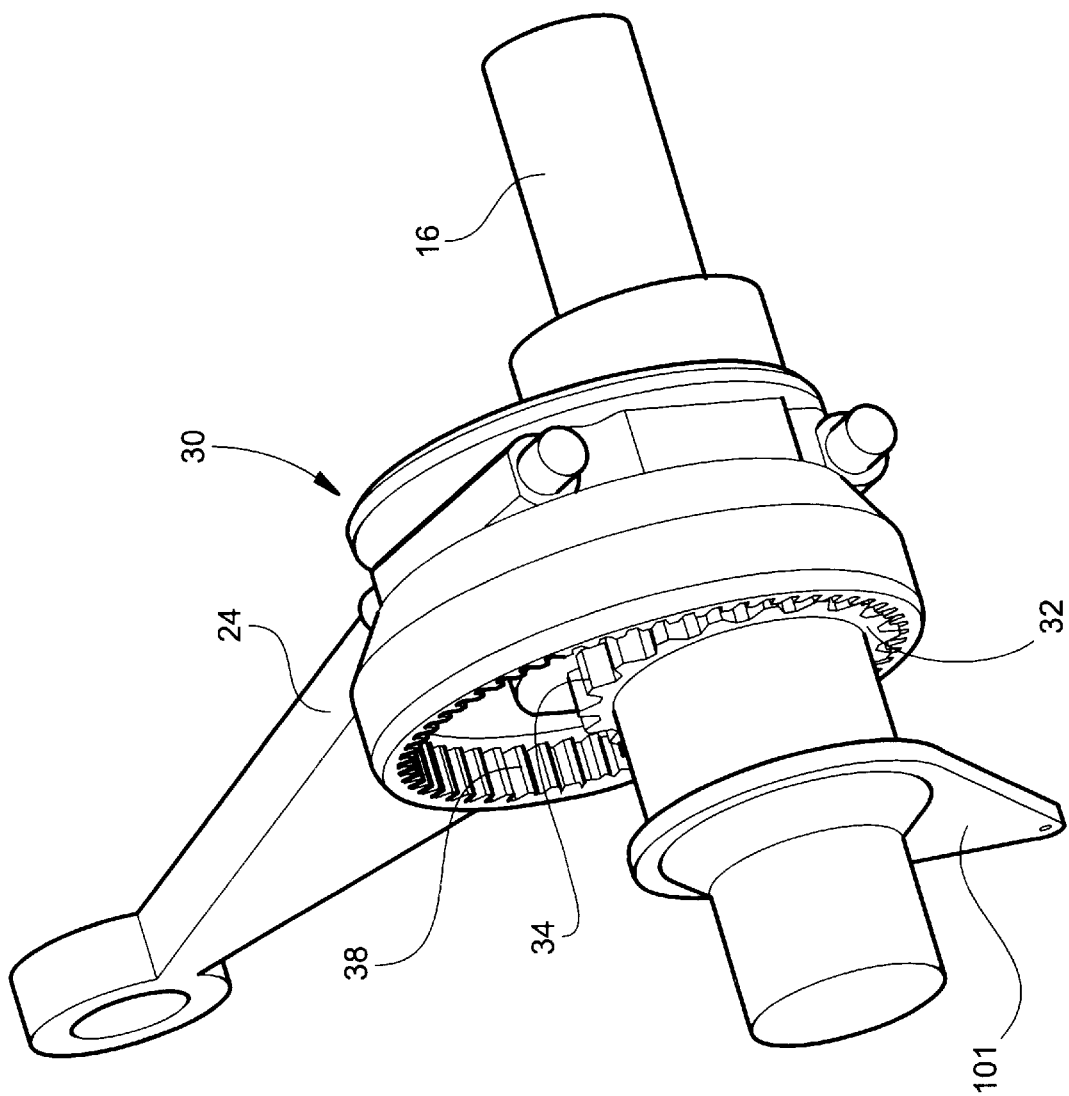

VARIABLE STROKE MECHANISM FOR INTERNAL COMBUSTION ENGINE

BACKGROUND OF THE INVENTION

The present invention relates broadly to internal combustion engines and, more particularly, to a mechanism for varying the stroke of an internal combustion engine over all four cycles, or "strokes", of engine operation. This mechanism acts to increase the efficiency of internal combustion engines by imposing a larger expansion stroke and a shorter intake stroke; meanwhile, the crankshaft arm will be gradually enlarged during the explosion or expansion stroke and gradually reduced during the admission or intake stroke. A modified thermodynamic cycle results from this particular piston movement.

The present invention acts to increase the efficiency of internal combustion engines. Fixed stroke internal combustion engines operate according to a predetermined cycle characterized by an intake stroke, a compression stroke, an expansion stroke, and an exhaust stroke. In this sense, "stroke" is used to describe the movement of the piston through the maximum distance the piston travels during an excursion through the cylinder. It is also used herein to be the equal of "cycle", as when describing a four-cycle (or four stroke) engine, indicating that to complete a full power cycle the piston must reciprocate four times in the cylinder. "Cycle" is also used to describe the complete power cycle, such as the aforementioned Otto cycle. This usage is consistent within this art and, in context, should not confuse those so skilled.

A theoretical cycle of interest in analyzing the behavior of reciprocating spark ignition engines is the Otto cycle. FIG. 9 illustrates a pressure-volume (P-V) diagram of the Otto cycle superimposed with a P-V diagram of a modified cycle resulting from the present invention. The Atkinson cycle is characterized by complete expansion within the cylinder to exhaust pressure. When compared to conventional cycles, the Atkinson cycle offers a significant increase in efficiency, especially in engines with low compression ratios. The present invention offers the advantages provided by over-expansion due to its variable stroke feature.

Attempts have been made to make the piston travel a longer or shorter distance during the intake, compression, expansion, or exhaust strokes or during any combination of them. Also, the piston velocity has been modified in some portion of the piston travel, for every revolution or every two revolutions. The top or bottom dead center of the piston has been shifted up or down for every revolution or every two revolutions. All of these conditions are different versions of a variable stroke. Chadbourne U.S. Pat. No. 1,326,129 and Clarke U.S. Pat. No. 4,044,629 are patent documents that refer to an extended expansion stroke. A practical application of an extended expansion stroke is the Mazda Millenia, incorporating the Miller-cycle engine designed in 1947 by U.S. engineer Ralph Miller. Miller's engines have been used for some time in ships and stationary power plants. The engineering goal achieved is to reduce the engine's compression ratio without interfering with the power generating expansion stroke. In the Miller-cycle engine, the piston rises one-fifth of its stroke before the air intake valve is closed. After combustion occurs at the top of the stroke, the expanding gases push the piston all the way down to the bottom of the stroke, so the expansion ratio is not affected.

During the first half of the twentieth century, it was generally accepted that the combustion products inside an engine cylinder had to be removed as much as possible. Many different patents exist based in ways and means to obtain a larger exhaust stroke. Hulse U.S. Pat. No. 1,326,733; Svete U.S. Pat. No. 2,394,269; Cady U.S. Pat. No. 1,786,423; Tucker U.S. Pat. No. 1,964,096; and Austin U.S. Pat. No. 1,278,563 all emphasize this idea. Chadbourne U.S. Pat. No. 1,326,129 and Clarke U.S. Pat. No. 4,044,629 also refer to a larger exhaust and expansion stroke. However, due to new emission regulations, the idea of removing as much of the combustion products as possible is no longer the rule. Therefore, longer exhaust stroke is no longer stressed. On the contrary, during the last three decades, exhaust gas recirculation has been incorporated in most car engines. NOx (oxides of nitrogen) is a tailpipe emission caused by the oxidation of nitrogen in the combustion chamber. When the peak combustion temperatures get over 2500° F., NOx is formed in excessive amounts. To keep the combustion temperatures down, exhaust gas is recirculated in most cars. This is accomplished by allowing intake manifold vacuum to draw exhaust gas into the intake manifold through an EGR (exhaust gas recirculation) valve. The present invention eliminates this device by allowing the adjustment of the top dead center of the piston (while ending the exhaust stroke) to retain the optimum amount of residual gas.

Others have used the variable stroke idea to modify the engine compression ratio. A lot of work has been done, especially in Europe and Japan, to achieve the so-called variable compression ratio. This is achieved by means of an arrangement that varies the position of the piston relative to the head of the cylinder.

The compression ratio is the ratio between capacity of the cylinder and capacity of the combustion chamber; in other words, the air-fuel mixture that goes into the cylinder during the admission stroke is then compressed as many times as the compression ratio value. Generally, the higher the compression ratio, the higher the engine efficiency. Some limitations such as mixture pre-ignition, knocking, engine temperature, and even engine construction exist. Since the compression ratio is one of the main factors affecting the engine efficiency, it is desirable to optimize it for different operation conditions (speed rate, load, acceleration, etc.). In some cases, this is performed automatically and in others in a selective manner according to the operating conditions. Schechter U.S. Pat. No. 5,165,368 is an example of the previous case. Note that the variation of the top dead center, when the piston is completing the compression or exhaust stroke is the same for a fixed operating condition. Therefore, the variation of the top dead center is a function of the operating condition and not a different thermodynamic cycle. In other words, the compression ratio and the expansion ratio have the same value. For the present invention, the compression ratio is different from the expansion ratio.

Another example of variable stroke application is the optimization of the pressure acting on the piston. To achieve this, the piston speed is decreased, relative to the speed of a conventional piston, near the top dead center to maximize the combustion process and the resulting forces acting on the piston. Schaal et al U.S. Pat. No. 5,158,047, Williams U.S. Pat. No. 5,060,603, and McWhorter U.S. Pat. Nos. 3,686,972; 3,861,239; and 4,152,955 are related to this variable stroke group.

SUMMARY OF THE INVENTION

It is accordingly an object of the present invention to provide a modified internal combustion engine and a mechanism for so modifying the internal combustion engine which will enhance the thermoefficiency of the engine.

It is another object of the present invention to provide a mechanism wherein the stroke is generally increased during the expansion portion of the power cycle.

It is another object of the present invention to provide an internal combustion engine wherein the stroke is reduced during the admission or intake portion of the cycle.

It is yet another object of the present invention to provide an improved internal combustion engine whereby during the admission or intake and exhaust portions of the cycle, there is a reduced effective stroke thereby reducing the power needed for propelling the pistons with a reduced piston velocity, favoring volumetric efficiency, and a reduced piston travel distance, requiring reduced energy for operation.

It is another object of the present invention to provide an improved internal combustion engine that includes an increased crank arm length during the power stroke to increase the torque output.

It is another object of the present invention to provide an improved internal combustion engine that reduces the piston velocity during the intake stroke to increase volumetric efficiency.

To those ends, an improved internal combustion engine includes an engine block with at least one combustion chamber formed therein with a piston disposed within the combustion chamber, a connecting rod pivotally mounted to the piston, and a crank shaft rotatably mounted to the engine block and having the connecting rod rotatably mounted thereto and wherein the internal combustion engine operates according to a four stroke power cycle including an intake stroke, a compression stroke, an expansion stroke, and an exhaust stroke with the improvement including a gear set having at least two gear members with a first gear member being non-rotatably mounted to the engine block and a second gear member operatively engaged with the first gear member and having two bearing surfaces formed thereon, and an offset member separating two bearing surfaces and defining a first offset distance, with a first bearing surface having the connecting rod mounted thereto and the second bearing surface being mounted to the crankshaft for rotation of the second gear member therewith with the offset member rotating with the second gear member intermediate the connecting rod and the crankshaft for producing a stroke length that varies through a complete engine power cycle.

It is preferred that the second gear member include a generally cylindrical body with gear teeth extending radially inwardly from one inner surface of the cylindrical body. It is preferred that the teeth of the second gear member are operatively engaged with the teeth of the first gear member for rotation of the second gear member and the offset member in the same angular direction as the connecting rod and the crankshaft. It is preferred that the second gear member include a bearing member projecting outwardly therefrom with the first bearing surface formed on an outer surface of the bearing member and the second bearing surface being formed on a inner surface of the bearing member for rotation of the connecting rod on the first bearing surface and rotation of the bearing member on the crankshaft with the offset member being integral with the bearing member and the offset member being disposed intermediate the first bearing surface and the second bearing surface.

It is preferred that the first gear member be formed with a first predetermined number of teeth and the second gear member is formed with a second predetermined number of teeth with the second predetermined number of teeth being twice the first predetermined number of teeth thereby producing a 1:2 gear ratio.

It is preferred that the crankshaft be mounted to the engine block for rotation about the crank axis and the second bearing surface of the bearing member is mounted to a crankshaft bearing surface on the crankshaft, with the crankshaft bearing surface being offset from the crank axis by a predetermined distance, defining a second offset distance, the connecting rod thereby being offset from the crank axis by the sum of the second offset distance and the first offset distance thereby defining an effective stroke length.

It is preferred that the gear set be configured to drive the offset member in a manner resulting in the effective crank length during the expansion stroke being greater than the second offset distance. It is further preferred that the gear set be configured to drive the offset member in a manner resulting in the effective crank length during the intake stroke being less than the second offset distance. Preferably, the first offset distance includes a maximum offset distance that is displaced from a position in alignment with the second offset distance by an angle less than 90° at an initial position for the expansion stroke. It is further preferred that the internal combustion engine be a multi-cylinder engine having a plurality of combustion chambers and the improvement includes a plurality of gear sets corresponding in number to less than or equal to the combustion chambers.

The present invention further preferably can include an adjustment mechanism operatively engaged with said first gear member to provide an externally initiated small angle rotation of said first gear member to slightly vary the top dead center of the piston. The present invention also provides a mechanism for producing a stroke length in an internal combustion engine that varies throughout the complete engine power cycle. The internal combustion engine is as previously described and the mechanism includes the previously described gear set.

BRIEF DESCRIPTION OF THE DRAWINGS

FIG. 10 is a perspective view of an alternate mechanism for producing a variable stroke and providing an externally initiated adjustment device for slightly varying the top dead center of the piston.

DESCRIPTION OF THE PREFERRED EMBODIMENT

Figure 1:
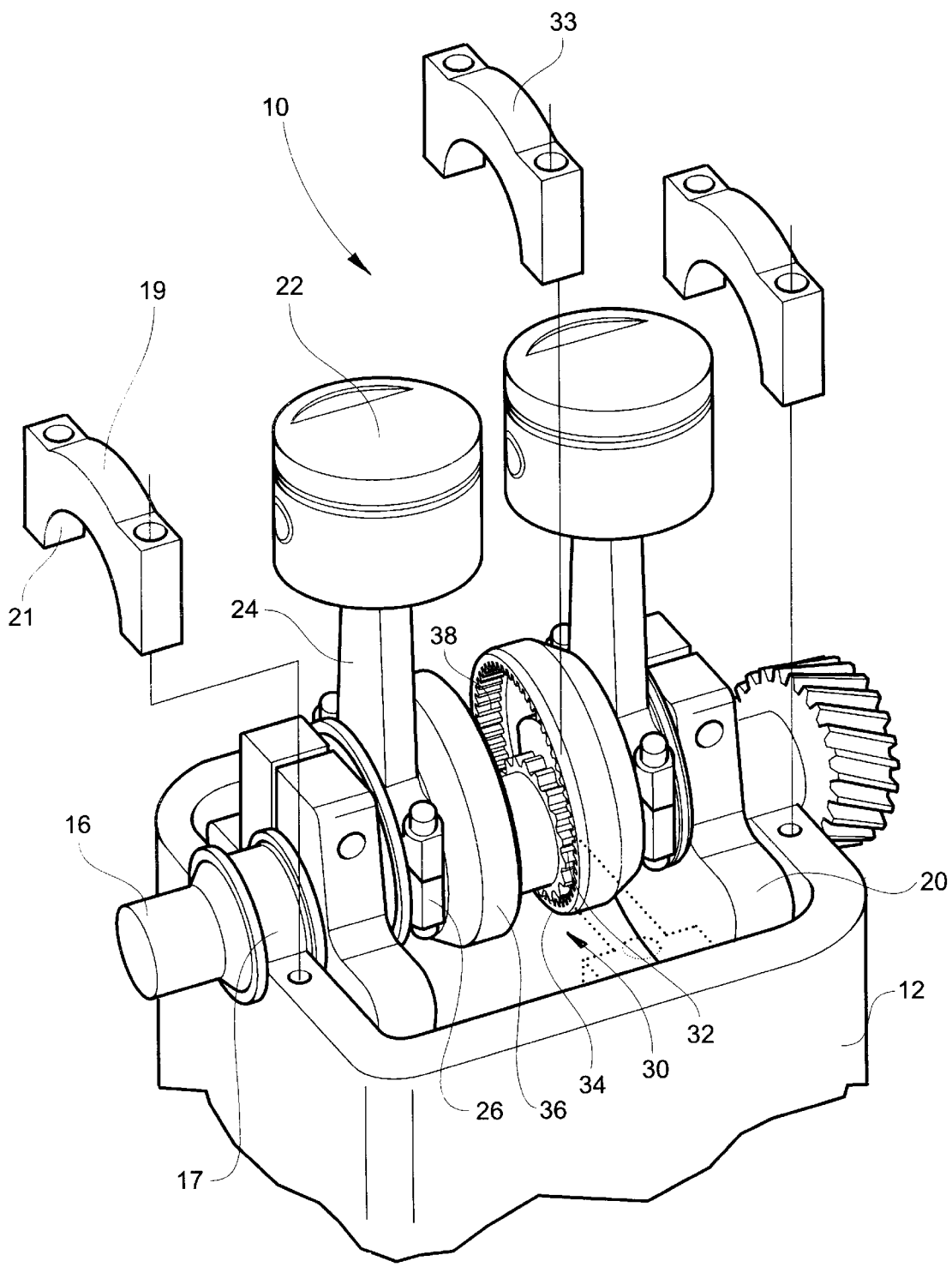
FIG. 1 is a perspective view of improved internal combustion engine according to the preferred embodiment of the present invention.

Turning now to the drawings and, more particularly to FIG. 1, an improved internal combustion engine according to the preferred embodiment of the present invention is illustrated generally at 10 and includes a conventional engine block 12. It should be noted that the engine block 12 is shown generally diagrammatically as a support for the mechanism according to the present invention. Further, for illustrative purposes, the engine is shown as a two-cylinder engine. Nevertheless, it will be appreciated by those skilled in the art that virtually any multi-cylinder engine, in varied configurations may be adapted to use the mechanism of the present invention.

A generally conventional crankshaft 16 is provided with a crankshaft bearing surface 17 at the junction of the crankshaft 16 and the engine block 12. A bearing cap 19 is formed as a form fitting archway having two bolt openings formed therein and a curved bearing surface 21 formed as an underside thereof. The bearing cap 19 is mounted to the engine block 12 with preformed openings in the engine block and the bearing cap 19 in registry. Conventional bolts hold the bearing cap in place on the engine block to retain the crankshaft 16 in place.

Two conventional pistons 22 are mounted to two identical conventional connecting rods 24 which are in turn mounted to the crankshaft 16 in a manner which will be revealed in greater detail hereinafter. Conventional end caps 26 are attached to the connecting rods 24 to retain them in a rotatable manner in association with the crankshaft 16. As will be seen in greater detail hereinafter, the connecting rods 24 are not mounted directly to the crankshaft 16 but are mounted to the bearing surface associated with the present invention. A pair of gear sets 30 are mounted to the crankshaft 16 with the gear sets 30 forming the primary driving portion of the present invention. Each gear set 30 includes a first gear member 32, or pinion in operational contact with a second gear member 36 or crown gear.

Eccentric counterweights 20 are mounted to the crankshaft for balancing, as would be required with a two cylinder engine. The gear sets 30 are configured as mirror images of one another to divide the engine 10 into two mirror-imaged halves, with the gear sets 30 in the center.

Figure 2:
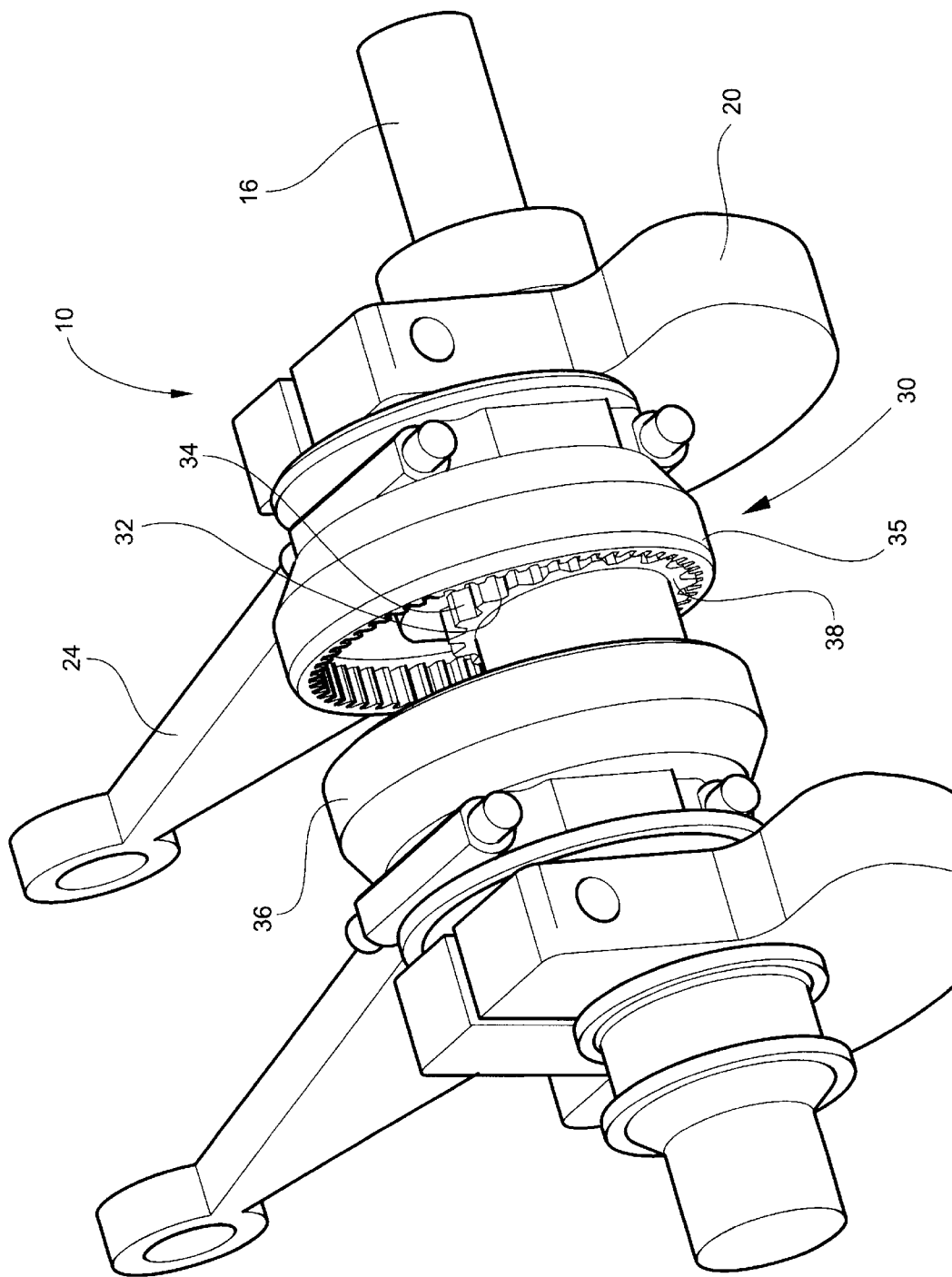
FIG. 2 is a perspective view of the mechanism for producing a variable stroke length in an internal combustion engine according to the preferred embodiment of the present invention.

With reference to FIG. 2, a first gear member 32 is illustrated as a cylindrical member having a row of teeth 34 formed therearound. The second gear member 36 is formed as a cup-like generally cylindrical member having a continuous array of teeth 38 formed around an inner surface thereof. The two first gear members 32 are separated by and mounted to a cylindrical support member 35 which is fixed to the engine block by a clamping member 33 as seen in FIG. 1. The first gear member 32 is fixed in position within the engine block and is not intended to rotate. The second gear member 36 is operationally engaged with the first gear member for rotation thereabout in a planetary manner.

Figure 3:
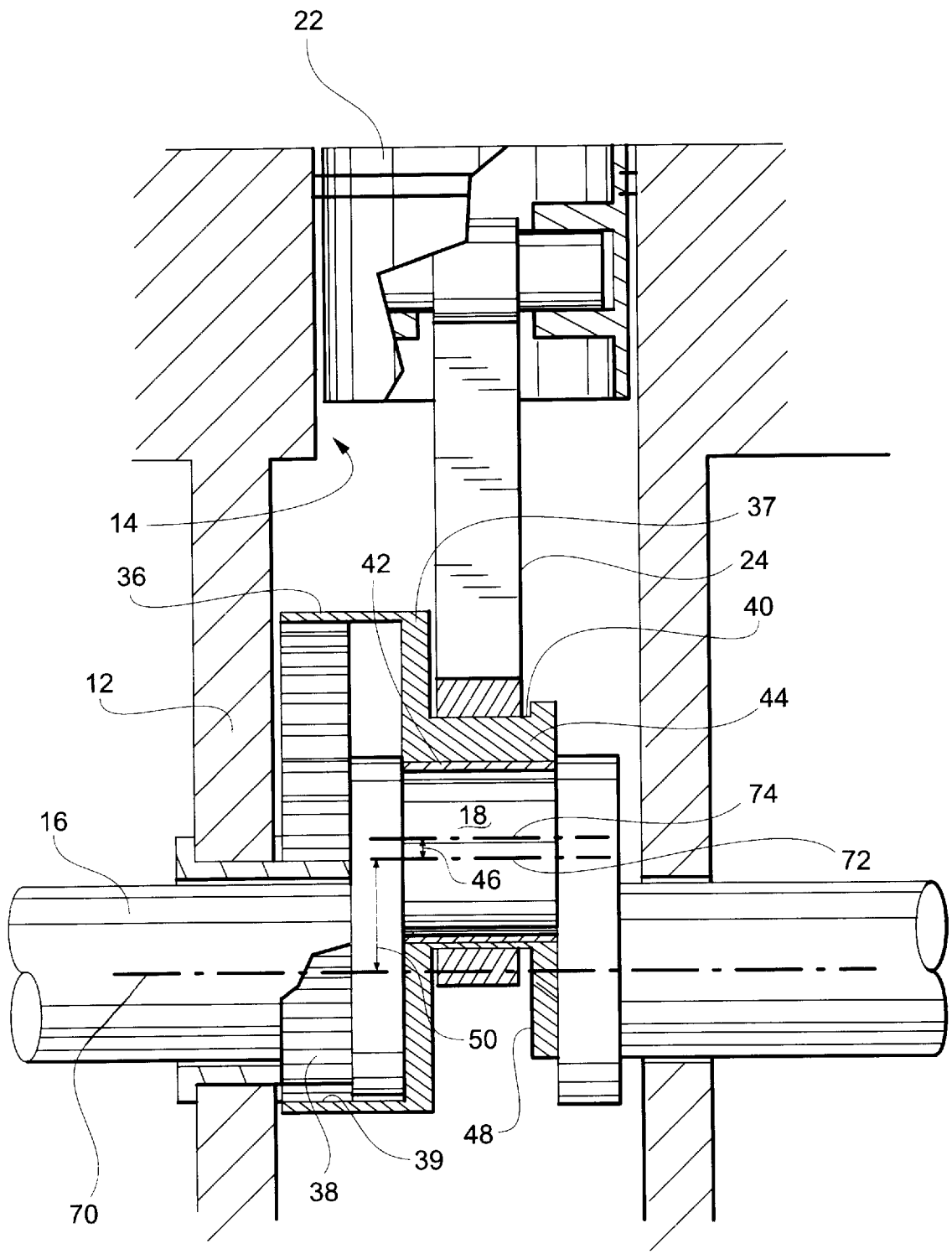
FIG. 3 is a cutaway diagrammatic view of a mechanism for producing a variable stroke length in an internal combustion engine.
Figure 4:
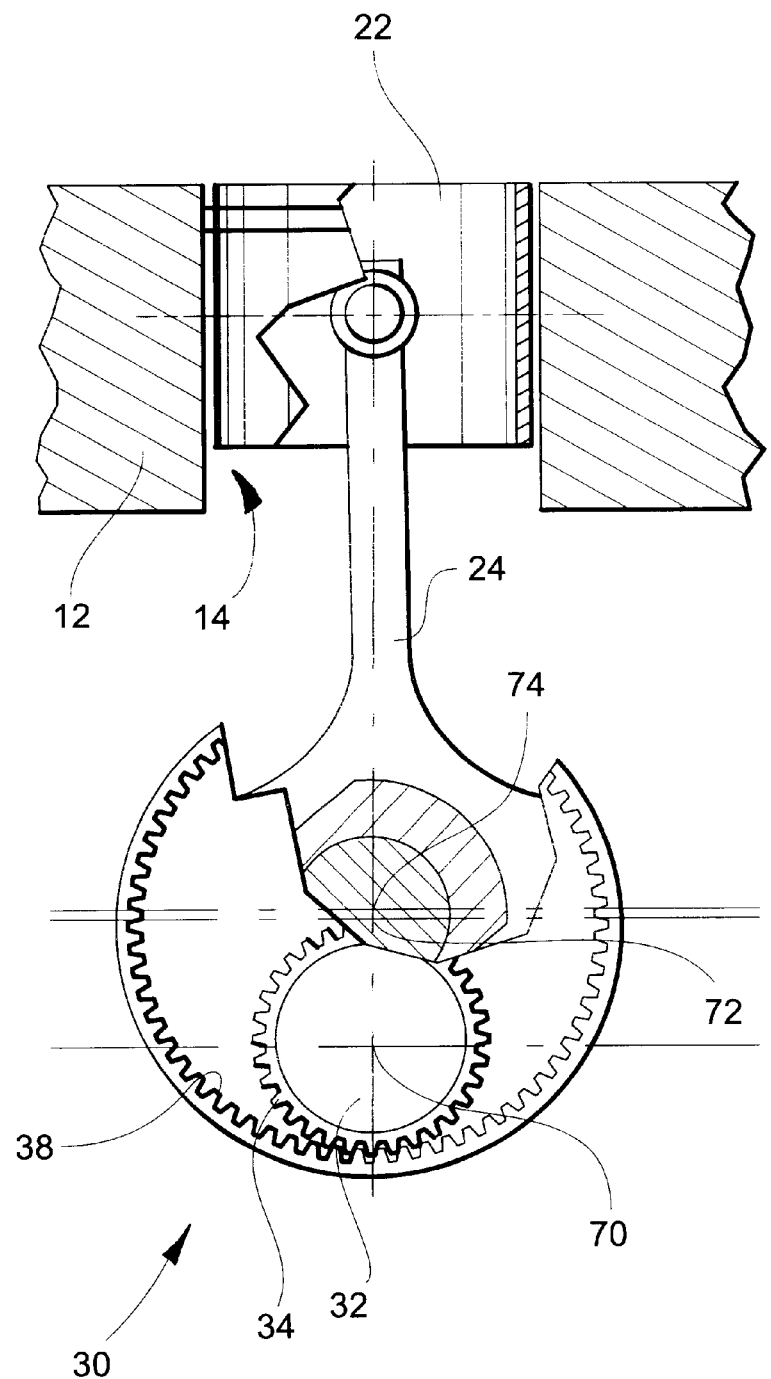
FIG. 4 is a second cutaway view of the mechanism illustrated in FIG. 3.

Turning now to FIGS. 3 and 4, a more diagrammatic representation of the improvement according to the present invention is provided. There, the engine block is illustrated generally at 12 to define a cylinder 14 through which the piston 22 moves.

The second gear member 36 includes a body 37 with a bearing member 48 formed therewith to project outwardly therefrom and has a first bearing surface 40 formed thereon at a position linearly displaced from the gear teeth 38 which project inwardly from an inner surface 39 of the second gear member 36. The first bearing surface 40 extends circumferentially around a portion of the body 37 for contact with the connecting rod 24. A second bearing surface 42 is formed radially inwardly from the first bearing surface 40 and is separated therefrom by an offset member 44. The offset member 44 extends between the bearing surfaces 40,42 and defines a maximum offset distance 46 which will be explained in greater detail presently. The bearing member 48 defining the bearing surfaces 40,42 may be formed integrally with the gear member 36, yet this is not a specific requirement. The only requirement is that the bearing member 48 rotate with the gear member 36 and integral formation is the simplest way to achieve this.

As seen in FIGS. 3 and 4, three rotational axes are defined. Initially, the crankshaft 16 rotates about a crankshaft axis 70 which, as seen in FIG. 4, is coincident with an axis about which the first gear member 32 would rotate, should it be freely rotatable. The adjustment of the first gear member 32 causes a few degrees of rotation about the crankshaft axis 70. The offset member 44 rotates about an offset axis 72 which extends parallel to the crankshaft axis 70 and is offset therefrom by a predetermined distance 50. This crankshaft offset 50 is present in every crank-driven internal combustion engine and provides an arm through which the pumping action of the piston is translated into rotation of the crankshaft 16. Due to the presence of the offset member 44, the connecting rod 24 rotates about a separate axis 74 which also extends parallel to the crankshaft axis 70 and the offset axis 72. The distance between the offset axis 72 and the connecting rod axis 74 is defined as the maximum offset distance 46 and the maximum offset distance 46 combines with the crankshaft offset 50 to define the effective crank length which, as will be seen in greater detail hereinafter, varies throughout the engine operational cycle.

Those skilled in the art will appreciate that the engine thusly described lacks any valve system, cooling system, ignition system, and the accompanying structural components to provide a fully operational internal combustion engine. These components are beyond the scope of the present invention and are omitted so that the present invention may be described with greater clarity and the aforesaid necessary systems do not differ from the standard internal combustion engine. Any suitable valving system, cooling system, ignition system, and associated structural components will operate satisfactorily with the present invention and it should be noted that the present invention is adaptable to virtually any standard crank-driven internal combustion engines.

As in conventional internal combustion engines, detonation of an air fuel mixture in a combustion chamber drives the piston downwardly and causes rotation of the crankshaft. Multi-cylinder engines provide multiple piston/cylinder arrangements arranged for sequential detonation of the fuel air mixture in a predetermined sequence for smooth engine operation. Generally, the greater number of cylinders, the smoother the engine will operate. Although the present invention is shown as a two-cylinder engine, the present invention is full adaptable to virtually any number of cylinders. The present invention is also adaptable to radial engines.

Figure 9:
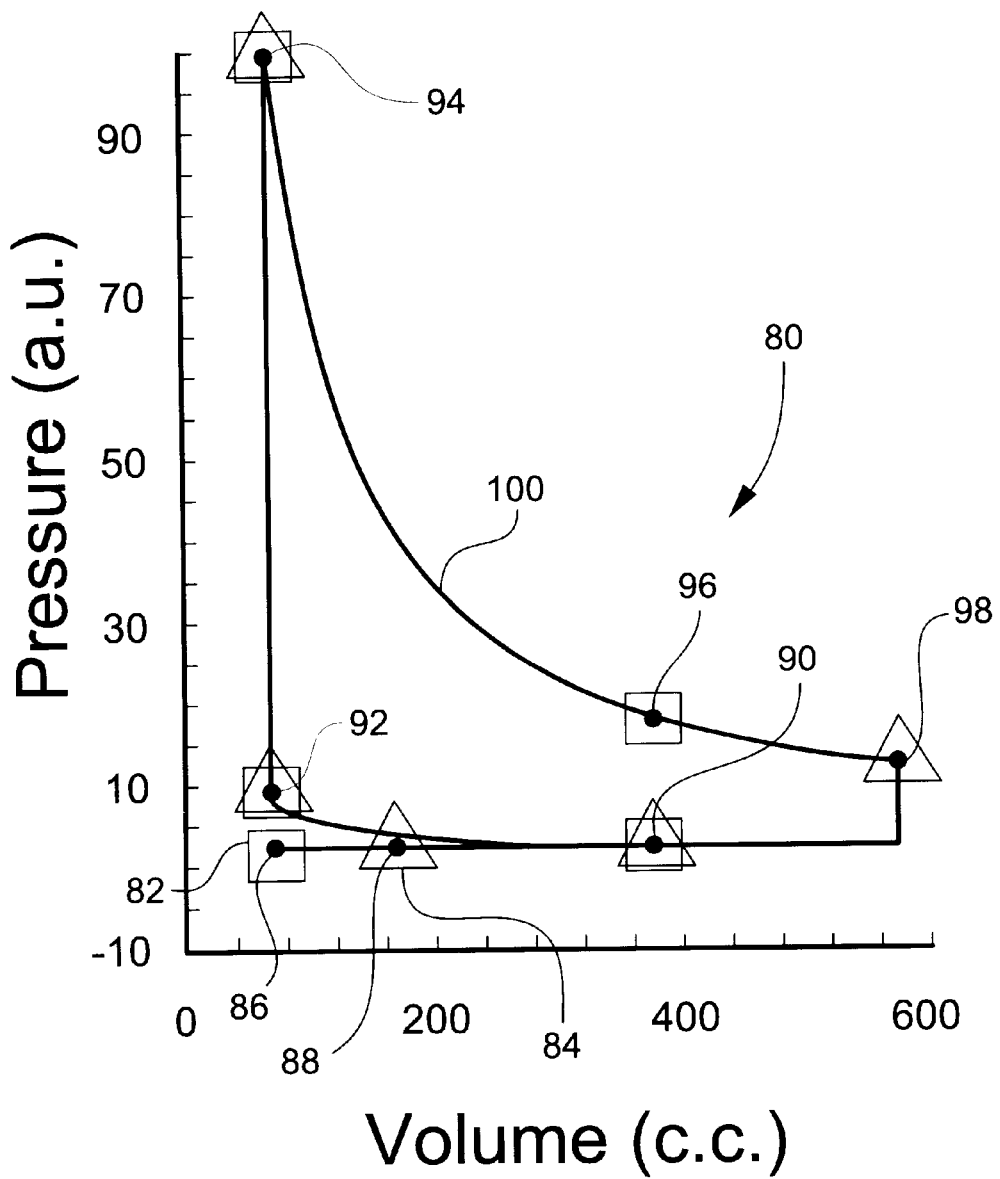
FIG. 9 is a pressure-volume diagram illustrating the superposition of an Otto cycle and the improved cycle according to the preferred embodiment of the present invention.

The improvement acts to vary the effective stroke length or the extent of piston travel throughout the four strokes of the complete engine operational power cycle. The engine according to the present invention operates according to a modified Atkinson or Miller cycle and FIG. 9 illustrates a pressure-volume (P-V) diagram of the present invention's operational cycle superimposed over a conventional Otto cycle. A full cycle of engine operation is defined by four separate strokes, the intake, or admission, stroke, the compression stroke, the expansion stroke, the emission, or exhaust stroke. During the intake stroke, the engine's intake valves are opening and the piston is drawn downwardly by rotation of the crankshaft which draws the fuel air mixture into the combustion chamber. During the compression stroke, the fuel air mixture is compressed in the combustion chamber and at a predetermined time, the spark plug will fire which causes detonation of the fuel air mixture thus driving the piston downwardly through the expansion stroke as the gas expands. During the exhaust or emission stroke, the exhaust valves open and the piston drives the waste gases from the combustion chamber to await a repeat of the four strokes or cycles of the four-cycle engine. The stroke length is defined as the distance the piston travels within the combustion chamber during each of the four strokes of the operational cycle. In a conventional internal combustion engine, the stroke length is fixed and does not vary throughout the four operational strokes of the engine operational power cycle.

The present invention acts to provide a variable stroke length and, since the teeth of the second gear member are formed on a inner surface thereof, the second gear member 36 rotates about the first gear member 32 in the same direction as the crankshaft 16 rotates. Since the gearing provides a 1:2 gear ratio, the offset member 44 and the maximum offset 46 rotate through a half-turn for every single rotation of the crankshaft 16. The effect of this is seen in FIGS. 5–8. Each of FIGS. 5–8 illustrates a single stroke of the engine's operational power cycle.

Figure 5:
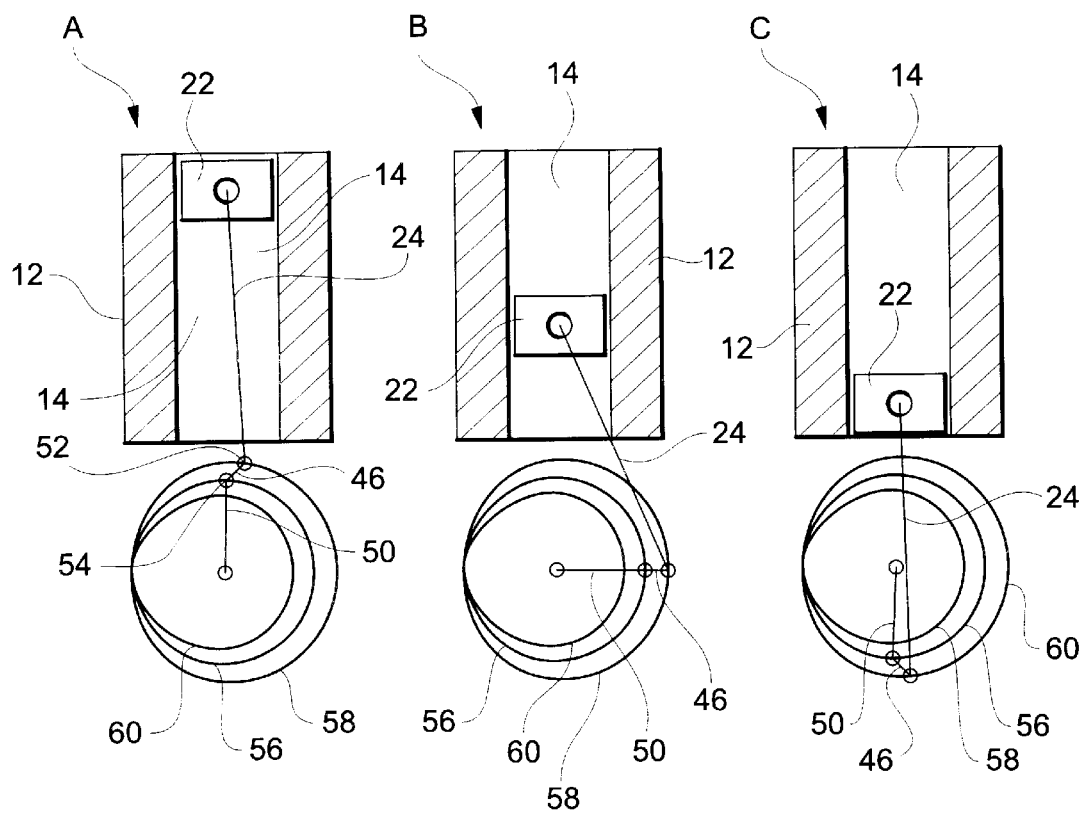
FIG. 5 is a diagrammatic view of the expansion stroke of an internal combustion engine according to the preferred embodiment of the present invention.

Turning now to FIG. 5, the initial position of the piston 22 is illustrated at A with the intermediate position illustrated at B and the final position illustrated at C. It will be noted throughout FIGS. 5–8 that the final position of one stroke is also the initial position of the next stroke and the identifying letters reflect this. As indicated at A in 52, the junction between the offset member and the connecting rod is illustrated at 52 while the junction between the offset member and the crankshaft is illustrated at 54. Therefore, the maximum offset distance 46 is illustrated as extending between the junction between the connecting rod and the offset member 52 and the junction between the offset member and the crank shaft 54. The crankshaft offset is illustrated at 50.

During rotation of the crankshaft, the offset member/crankshaft junction 54 traces a circular path 56 as it rotates. The connecting rod/offset junction 52 traces two separate paths, a first path 58 and a second path 60. Further, it will be noted that at the initial position, the maximum offset 46 is angled away from being aligned with the crankshaft offset 50 with the angular relationship being less than 90° and is typically on the order of 45°.

Since FIG. 5 illustrates the expansion stroke, it can be seen that the maximum offset 46 and the crankshaft offset 50 add to increase the stroke length after detonation during the expansion or power stroke. It should be noted that, but for the presence of the maximum offset 46, the connecting rod 24 would be joined to the crankshaft 50 at 54. Bearing this in mind helps to illustrate the variable stroke length of the present invention. The increase of the effective stroke length acts to increase the work done by the engine 10. At C in FIG. 5, the expansion stroke has been completed and the exhaust stroke begins. At this position, the crankshaft 16 and its accompanying offset 50 have rotated through one-half turn of the crankshaft while the maximum offset 46 has acted to add to the crankshaft offset 50 to increase the effective stroke length.

Figure 6:
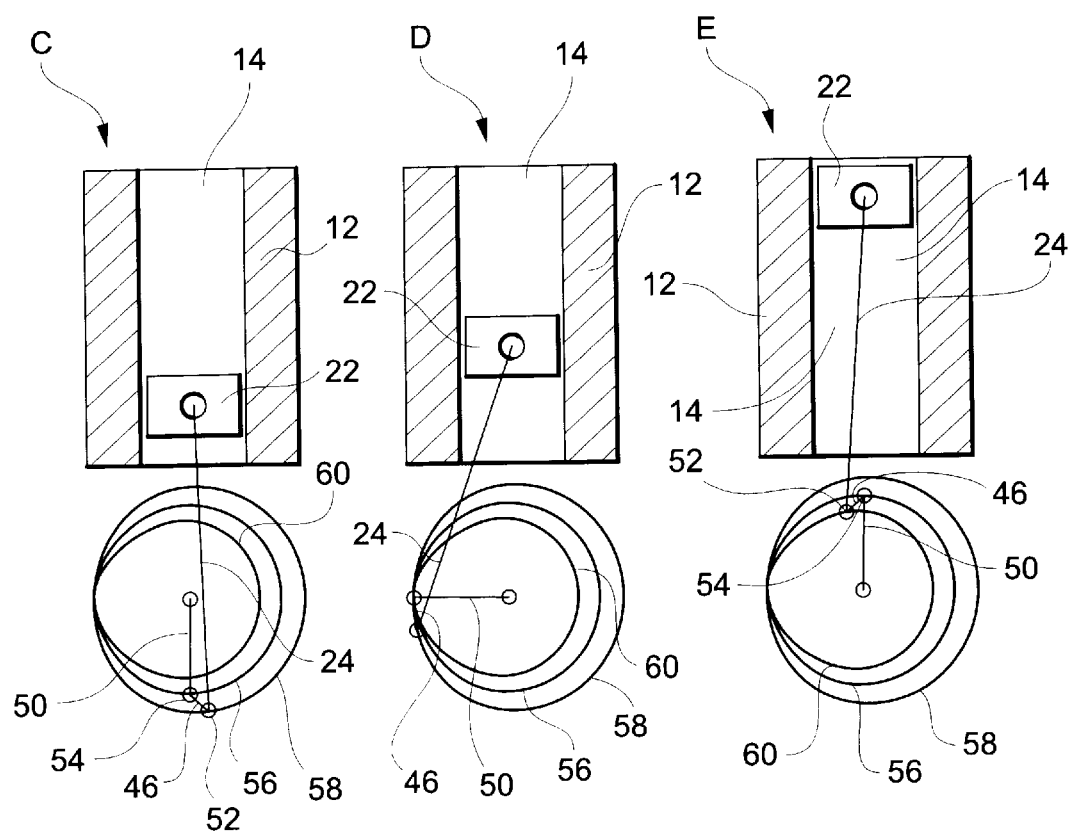
FIG. 6 is a diagrammatic view of the exhaust stroke of an internal combustion engine according to the preferred embodiment of the present invention.

Turning now to FIG. 6, the exhaust stroke is illustrated C, D, and E. At C, it can been seen that, in the circular paths of each junction 54,52, the crankshaft/offset junction 54 has passed the offset/connecting rod junction 52 which causes the variable stroke length to be shortened as more fully illustrated at D and E. As seen at E, the exhaust stroke has been completed and the effective stroke length is reduced by a predetermined amount due to the presence of the maximum offset 46. Therefore, due to the reduced effective stroke length, the work done by the piston in evacuating the combustion chamber is reduced.

Figure 7:
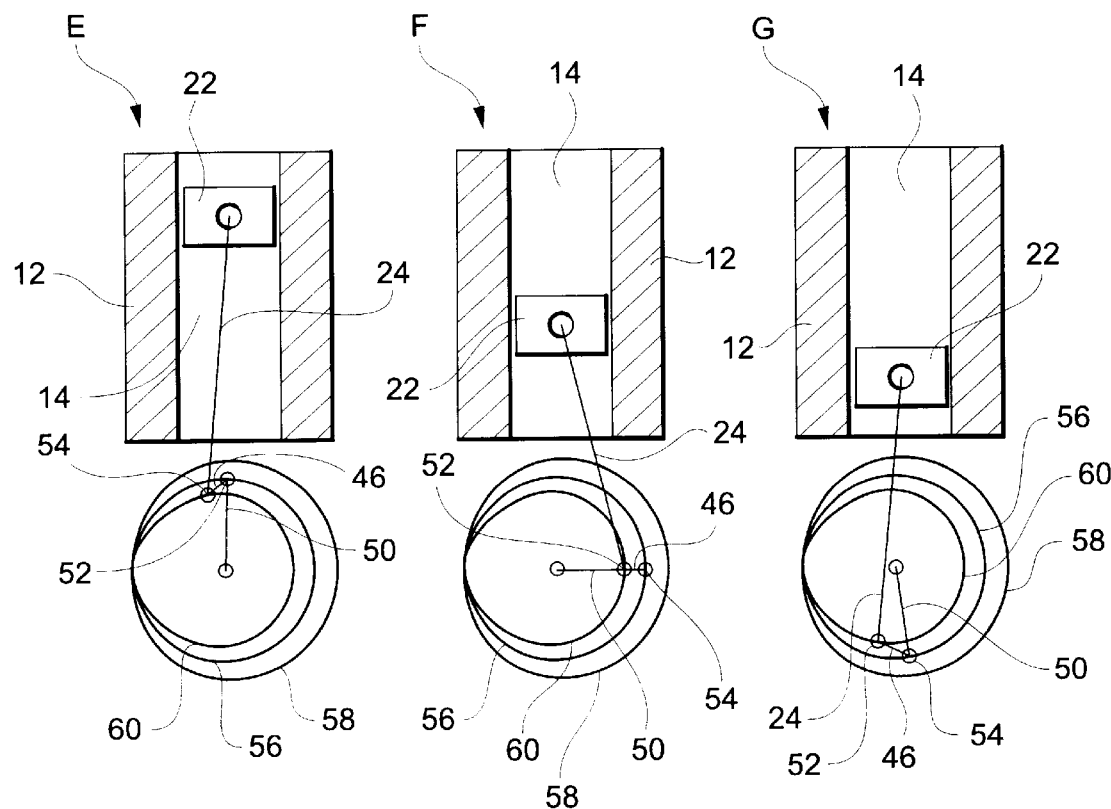
FIG. 7 is a diagrammatic view of the intake stroke of an internal combustion engine according to the preferred embodiment of the present invention.

FIG. 7 illustrates the intake stroke or the drawing in of the fuel/air mixture by the piston 22. As is consistent with FIGS. 5–8, the initial position of the intake stroke illustrated at E is consistent with the final position of the exhaust stroke, also illustrated at E in FIG. 6. During this portion of the operational cycle, the offset/connecting rod junction 54 is tracing the inner path 60, indicating that the effective stroke length has been reduced. This is more fully illustrated at F wherein the effective stroke length is reduced by an amount equal to the maximum offset 46. This continues through the final position illustrated at G in FIG. 7. At the initial position E in FIG. 7, the crankshaft has rotated through one-half rotation. The effective stroke length during the intake stroke has been reduced thereby reducing the amount of work that the engine must do in retracting the piston to admit the fuel/air mixture into the combustion chamber 14. As may be expected, reduction of the work expended by the engine will result in decreased fuel usage. As may be appreciated, the engine is being worked on during the expansion stroke and must expend energy during the remaining strokes.

Figure 8:
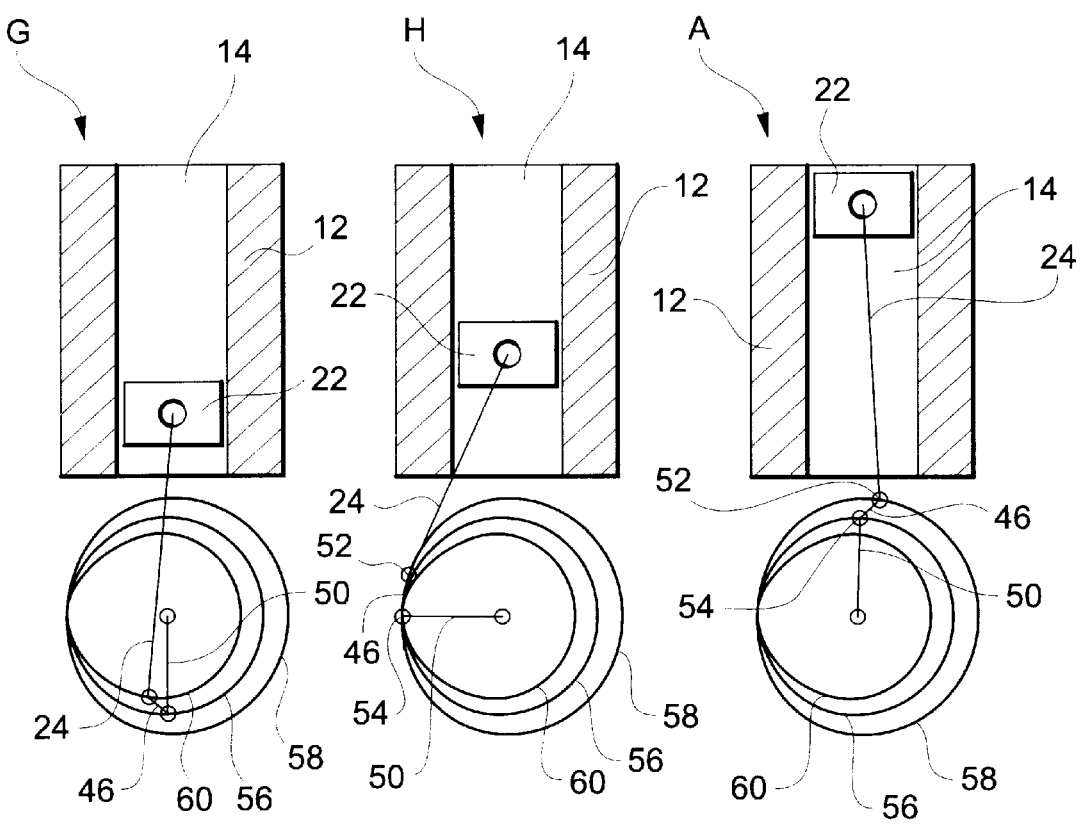
FIG. 8 is a diagrammatic view of the compression stroke of an internal combustion engine according to the preferred embodiment of the present invention.

Turning now to FIG. 8, the compression stroke is illustrated. At H, the offset/connecting rod junction 52 once again moves to the outer track 58 indicating that the maximum offset distance 46 will add to the effective stroke length. At A, it can be seen that the initial position as illustrated in FIG. 5 is once again achieved.

Turning to FIG. 9, the pressure/volume curve 100 for the cycle according to the present invention is superimposed over that of a conventional Otto cycle. The PV diagram is illustrated generally at 80. The Otto cycle starts with the admission or intake stroke at 86. At this point, the piston is at top dead center with minimum volume and atmospheric pressure. The modified cycle of the present invention begins its admission stroke at 88. Point 88 could actually be anywhere from the position illustrated in FIG. 9 to a position coincident with point 86 in FIG. 9. The exact position may be varied by adjusting the maximum offset 46 with respect to the crankshaft offset 50 at the beginning of the expansion or power stroke. This adjustment is defined by the initial setting of the second gear member. In FIG. 9, the maximum offset 46 was 45° away from the crankshaft offset 50. If the angular relationship is adjusted to 90°, then points 88 and 86 will be coincident at 86 in FIG. 9. The minimum volume is larger than the previous volume at the same atmospheric pressure. Next, in both cases, the piston moves to 90. The intake valve closes and again, in both cases, the piston 22 moves to 92, keeping the same compression ratio. Detonation then occurs, in theory, at constant volume and there is an instantaneous pressure increase in both cases to 94. Next, during the expansion stroke, the Otto cycle moves along the curve to 96 wherein the modified cycle, reflecting the increased stroke length moves to 98. Therefore, more work is done and more energy is extracted from the fuel .

Finally, the Otto cycle returns to 82 while the modified cycle of the present invention returns to 88. Since the area under the curve 100 represents the work done by the engine, it can be seen that the modified cycle of the present invention is more efficient by providing more work. It can also be seen in FIG. 9 that the expansion ratio is larger than the compression ratio.

As discussed above, an advantage of the present invention is that the effective stroke length is increased during the working or expansion stroke and reduced during the admission stroke which means increased work done by the fuel air mixture explosion and less work done by the engine. Additionally, at a constant angular crankshaft velocity, the piston velocity during the intake stroke will be reduced, favoring volumetric efficiency. With reference to FIG. 9l if the time to go from 88 to 90 is the same time needed to go from 94 to 98, then, since the distance from 88 to 90 is smaller, the velocity is also reduced. On the other hand, during the compression and expansion strokes, the piston velocity will be increased, thus minimizing the piston seal and heat losses.

Turning now to FIG. 10, an alternative form of the present invention is illustrated. There, a lever 101 is mounted to the first gear member 32. Movement of the lever 101 causes rotary movement of the first gear member 32 a few degrees. This adjustment alter s the angle between the maximum offset 46 and the crankshaft offset 50. This will act to vary slightly the top dead center of the piston.

The present invention provides several more advantages due to the variable stroke length. During the expansion stroke, there is a greater effective crankshaft arm that maximizes engine torque. During the emission and exhaust stroke, there is a smaller effective stroke length that minimizes the power needed for pumping, the piston velocity is smaller, thereby favoring volumetric efficiency and the piston travels a smaller distance requiring less energy.

It will therefore be readily understood by those persons skilled in the art that the present invention is susceptible of broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. In an internal combustion engine having an engine block with at least one combustion chamber formed therein with a piston disposed within said combustion chamber, a connecting rod pivotably mounted to said piston, and a crankshaft rotatably mounted to said engine block and having said connecting rod rotatably mounted thereto, wherein the internal combustion engine operates according to a four stroke cycle, including an intake stroke, a compression stroke, an expansion stroke and an exhaust stroke the improvement comprising a gear set including at least two gear members with a first gear member being non-rotatably mounted to said engine block and a second gear member operatively engaged with said first gear member and having two bearing surfaces formed thereon, an offset member separating said two bearing surfaces and defining a first offset distance, with a first bearing surface having the connecting rod mounted thereto, and said second bearing surface being mounted to the crankshaft for rotation of said second gear member therewith with said offset member rotating with said second gear member intermediate the connecting rod and the crankshaft for producing a stroke length that varies throughout a complete engine power cycle.

2. An improved internal combustion engine according to claim 1 wherein said second gear member includes a generally cylindrical body with gear teeth extending radially inwardly from one inner surface of said cylindrical body.

3. An improved internal combustion engine according to claim 1 wherein said teeth of said second gear member are operatively engaged with said teeth of said first gear member for rotation of said second gear member and said offset member in the same angular direction as the connecting rod and the crankshaft.

4. An improved internal combustion engine according to claim 3 wherein said second gear member includes a bearing member projecting outwardly therefrom with said first bearing surface formed on an outer surface of said bearing member and said second bearing surface being formed on an inner surface thereof for rotation of the connecting rod on said first bearing surface and rotation of said bearing member on the crankshaft, said offset member being integral with said bearing member and is disposed intermediate said first bearing surface and said second bearing surface.

5. An improved internal combustion engine according to claim 1 wherein said first gear member is formed with a first predetermined number of teeth and said second gear member is formed with a second predetermined number of teeth, with said second predetermined number of teeth being twice the first predetermined number of teeth, thereby producing a 1:2 gear ratio.

6. An improved internal combustion engine according to claim 1 wherein the crankshaft is mounted to the engine block for rotation about a crank axis and said second bearing surface of said bearing member is mounted to a crankshaft bearing surface on said crankshaft, said crankshaft bearing surface being offset from said crank axis by a predetermined distance, defining a second offset distance, said connecting rod thereby being offset from said crank axis by the sum of the second offset distance and said first offset distance, thereby defining an effective crank arm length.

7. An improved internal combustion engine according to claim 6 wherein said gear set is configured to drive said offset member in an manner resulting in the effective crank length during the expansion stroke being greater than the second offset distance.

8. An improved internal combustion engine according to claim 7 wherein said gear set is configured to drive said offset member in an manner resulting in the effective crank length during the intake stroke being less than the second offset distance.

9. An improved internal combustion engine according to claim 7 wherein said first offset distance includes a maximum offset distance that is displaced from a position in alignment with said second offset distance by an angle of less than ninety degrees at an initial position for the expansion stroke.

10. An improved internal combustion engine according to claim 1 wherein the internal combustion engine is a multi-cylinder engine having a plurality of combustion chambers and said improvement includes a plurality of gear sets corresponding in number to less than or equal to the number of combustion chambers.

11. An improved internal combustion engine according to claim 1 and further comprising an adjustment mechanism operatively engaged with said first gear member to provide an externally initiated small angle rotation of said first gear member to slightly vary the top dead center of the piston.

12. A mechanism for producing a stroke length in an internal combustion engine that varies throughout a complete engine power cycle, the internal combustion engine having an engine block with at least one combustion chamber formed therein with a piston disposed within said combustion chamber, a connecting rod pivotably mounted to said piston, and a crankshaft rotatably mounted to said engine block and having said connecting rod rotatably mounted thereto, the improvement comprising a gear set including at least two gear members with a first gear member being non-rotatably mounted to said engine block and a second gear member operatively engaged with said first gear member and having two bearing surfaces formed thereon, an offset member separating said two bearing surfaces, with a first bearing surface having the connecting rod mounted thereto, and said second bearing surface being mounted to the crankshaft for rotation of said second gear member therewith with said offset member rotating with said second gear member intermediate the connecting rod and the crankshaft for producing a stroke length that varies throughout a complete engine power cycle.

13. A mechanism according to claim 12 wherein said second gear member includes a generally cylindrical body with gear teeth extending radially inwardly from one inner surface of said cylindrical body.

14. A mechanism according to claim 13 wherein said teeth of said second gear member are operatively engaged with said teeth of said first gear member for rotation of said second gear member and said offset member in the same angular direction as the connecting rod and the crankshaft.

15. A mechanism according to claim 14 wherein said second gear member includes a bearing member and projecting outwardly therefrom with said first bearing surface formed on an outer surface of said bearing member and said second bearing surface being formed on an inner surface thereof for rotation of the connecting rod on said first bearing surface and rotation of said bearing member on the crankshaft, said offset member being disposed intermediate said first bearing surface and said second bearing surface.

16. A mechanism according to claim 12 wherein said first gear member is formed with a first predetermined number of teeth and said second gear member is formed with a second predetermined number of teeth, with said second predetermined number of teeth being twice the first predetermined number of teeth, thereby producing a 2:1 gear ratio.

17. A mechanism according to claim 12 wherein the crankshaft is mounted to the engine block for rotation about a crank axis and said second bearing surface of said bearing member is mounted to a crankshaft bearing surface on said crankshaft, said crankshaft bearing surface being offset from said crank axis by a predetermined distance, said connecting rod thereby being offset from said crank axis by the sum of the second offset distance and said first offset distance associated with said offset member, defining an effective crank arm length.

18. A mechanism according to claim 17 wherein said gear set is configured to drive said offset member in an manner resulting in the effective crank length during the expansion stroke that being greater than the second offset distance.

19. A mechanism according to claim 18 wherein said gear set is configured to drive said offset member in an manner resulting in the effective crank length during the admission stroke being less than the second offset distance.

20. A mechanism according to claim 18 wherein said first offset distance includes a maximum offset distance that is displaced from a position in alignment with said second offset distance by an angle of less than ninety degrees at an initial position for the expansion stroke.

21. A mechanism according to claim 12 wherein the internal combustion engine is a multi-cylinder engine having a plurality of combustion chambers and said improvement includes a plurality of gear sets corresponding in number less than or equal to the number of combustion chambers.

22. A mechanism according to claim 12 and further comprising an adjust mechanism operatively engaged with said first gear member to provide an externally initiated small angle of rotation of said first gear member to slightly vary the top dead center of the piston.

* * * * *